(12) United States Patent
Harada et al.

(10) Patent No.: US 10,322,399 B2
(45) Date of Patent: Jun. 18, 2019

(54) COATED NANOCLUSTERS FOR CARBON DIOXIDE ADSORPTION

(71) Applicant: Massachusetts Institute of Technology, Cambridge, MA (US)

(72) Inventors: Takuya Harada, Cambridge, MA (US); Trevor Alan Hatton, Sudbury, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 282 days.

(21) Appl. No.: 15/354,999

(22) Filed: Nov. 17, 2016

(65) Prior Publication Data

US 2017/0165633 A1    Jun. 15, 2017

Related U.S. Application Data

(60) Provisional application No. 62/256,241, filed on Nov. 17, 2015.

(51) Int. Cl.
*B01J 20/04* (2006.01)
*B01D 53/62* (2006.01)
*B01J 20/28* (2006.01)
*B01J 20/30* (2006.01)
(Continued)

(52) U.S. Cl.
CPC ......... *B01J 20/041* (2013.01); *B01D 53/02* (2013.01); *B01D 53/62* (2013.01); *B01J 20/04* (2013.01); *B01J 20/28007* (2013.01); *B01J 20/28016* (2013.01); *B01J 20/28059* (2013.01); *B01J 20/305* (2013.01); *B01J 20/3085* (2013.01); *B01J 20/3204* (2013.01); *B01J 20/3234* (2013.01); *B01J 20/3293* (2013.01); *B01D 2251/30* (2013.01); *B01D 2251/302* (2013.01); *B01D 2251/304* (2013.01); *B01D 2251/306* (2013.01); *B01D 2251/402* (2013.01); *B01D 2251/602* (2013.01); *B01D 2253/25* (2013.01); *B01D 2253/306* (2013.01); *B01D 2257/504* (2013.01); *B01D 2258/0283* (2013.01); *Y02A 50/2342* (2018.01); *Y02C 10/04* (2013.01); *Y02C 10/06* (2013.01); *Y02C 10/08* (2013.01)

(58) Field of Classification Search
None
See application file for complete search history.

(56) References Cited

U.S. PATENT DOCUMENTS

2011/0217220 A1* 9/2011 McLellan ............... B01D 53/62
                                                        423/230
2013/0195742 A1* 8/2013 Hamad ................... B01D 53/94
                                                        423/213.2
(Continued)

FOREIGN PATENT DOCUMENTS

WO    WO 2013/126477 A1    8/2013

OTHER PUBLICATIONS

International Preliminary Report on Patentability dated May 31, 2018 for Application No. PCT/US2016/062621.
(Continued)

*Primary Examiner* — Anita Nassiri-Motlagh
(74) *Attorney, Agent, or Firm* — Wolf, Greenfield & Sacks, P.C.

(57) ABSTRACT

The present invention generally relates to compounds, systems, and methods for adsorption of $CO_2$ onto nanoclusters.

20 Claims, 9 Drawing Sheets

(51) Int. Cl.
  *B01J 20/32*   (2006.01)
  *B01D 53/02*   (2006.01)

(56) References Cited

U.S. PATENT DOCUMENTS

2014/0356973 A1    12/2014   Okrut et al.
2015/0190777 A1*   7/2015    Shen .................. B01D 53/02
                                              423/230

OTHER PUBLICATIONS

International Search Report and Written Opinion for PCT/US2016/062621, dated Jan. 23, 2017.
Harada et al., Colloidal nanoclusters of MgO coated with alkali metal nitrates/nitrites for rapid, high capacity $CO_2$ capture at moderate temperature. Chem Mater. 2015;27(23):8153-61. Doi: 10.1021/acs.chemmater.5b03904.

* cited by examiner

COATED NANOCLUSTERS FOR CARBON DIOXIDE ADSORPTION

RELATED APPLICATIONS

This application claims priority to U.S. Provisional Patent Application Ser. No. 62/256,241, filed Nov. 17, 2015, entitled, "$CO_2$ ADSORBENTS BASED ON MGO NANOPARTICLE CLUSTERS COATED WITH ALKALI-METAL SALTS," which is herein incorporated by reference in its entirety for all purposes.

FIELD OF THE INVENTION

The present invention generally relates to compounds, systems, and methods for adsorption of carbon dioxide ($CO_2$) onto nanoclusters.

BACKGROUND OF THE INVENTION

There is a long-term need to suppress $CO_2$ emissions from the burning of fossil fuels to avoid dangerous anthropogenic interference with the climate system. For example, in 2014, around 2.2 billion tons of $CO_2$ were generated from coal-fired electric power plants in the US, representing 40% of the nation's emissions. Another about 25% of the US emissions from fossil fuels are from mobile sources. There is, therefore, a necessity to stem this release by developing post-combustion carbon capture technologies, which may be added to new plants or retrofitted to existing plants or for use in other $CO_2$ generating applications, including mobile sources such as vehicles, trains and ships.

Accordingly, improved methods and compounds for adsorbing $CO_2$ are needed.

SUMMARY OF THE INVENTION

The present invention generally relates to compounds and methods for removal of carbon dioxide from a gas stream or atmosphere.

According to one or more embodiments, compounds comprising a plurality of coated nanoclusters are described. Each of the coated nanoclusters may comprise a core and a shell surrounding the core. The core may comprise MgO. The shell may comprise alkali metal salt, wherein the alkali metal salt comprises alkali metal cations and at least one of nitrate anions and nitrite anions.

According to one or more embodiments, methods of manufacturing a nanocluster, are described. The method may comprise reacting a first solution comprising a source of magnesium, surfactant, and diol species, in a non-aqueous solvent, to synthesize a plurality of colloidal surfactant-coated nanoclusters comprising magnesium oxide (MgO). The method may further comprise removing the surfactant from the plurality of colloidal surfactant-coated nanoclusters to produce a plurality of colloidal nanoclusters. The method may further comprise dispersing the plurality of colloidal nanoclusters in a second solution comprising methanol and at least one salt comprising alkali metal cations and at least one of nitrate anions and nitrite anions. The method may further comprise evaporating the methanol to induce precipitation of a plurality of precursor coated nanoclusters. The method may further comprise re-dispersing the plurality of precursor coated nanoclusters in a suspension comprising ethanol. The method may further comprise evaporating the ethanol to provide a plurality of coated nanoclusters, each of the coated nanoclusters comprising: a core comprising MgO; and a shell surrounding the core, the shell comprising alkali metal salt, wherein the alkali metal salt comprises alkali metal cations and at least one of nitrate anions and nitrite anions.

According to one or more embodiments, methods of removing $CO_2$ from a gas stream are generally described. The method may comprise introducing the gas stream comprising $CO_2$ to a plurality of coated nanoclusters, each of which comprises a core comprising MgO and a shell surrounding the core, the shell comprising alkali metal salt in a molten state, wherein the alkali metal salt comprises alkali metal cations and at least one of nitrate anions and nitrite anions. The method may further comprise adsorbing a portion of $CO_2$ from the gas stream onto the plurality of coated nanoclusters to produce a $CO_2$-reduced gas stream.

Figure 1:
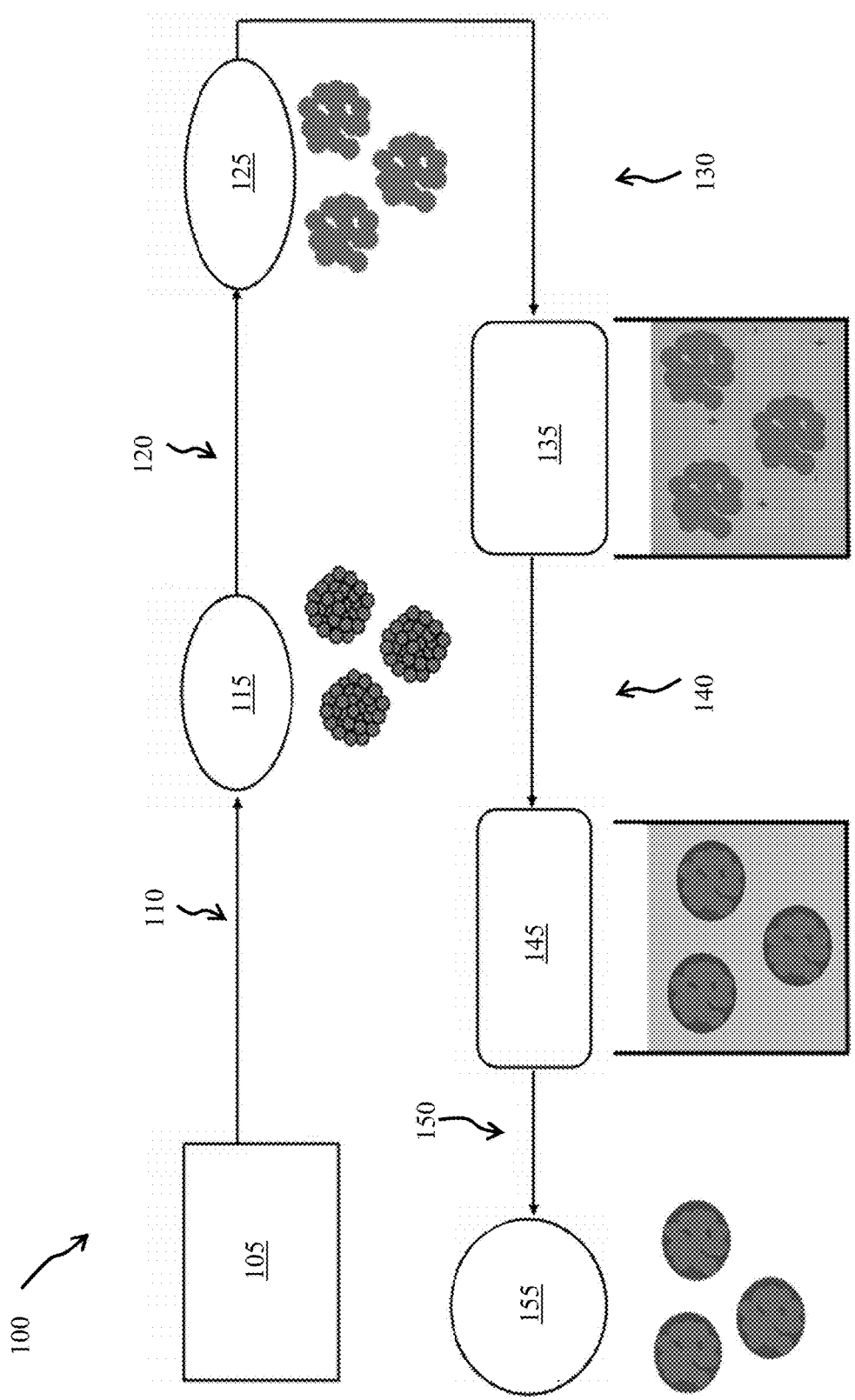
FIG. 1 shows a process for formation of a CO2 adsorbent, according to one or more non-limiting embodiments.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to compounds and methods for removal of carbon dioxide from a gas stream or atmosphere.

According to one or more embodiments, a compound comprising a plurality of nanoclusters is generally described. The nanocluster is a particle or an assembly of multiple particles having a length in its longest dimension ranging from 1 nm to 1000 nm. The nanoclusters may be used as a $CO_2$ adsorbent. Each of the nanoclusters may comprise a core comprising metal oxide. In some embodiments the core comprises magnesium oxide (MgO). Each of the nanoclusters may further comprise a shell surrounding the core.

The shell may comprise alkali metal salt. As used herein, the phrase "alkali metal salt" has its ordinary meaning and refers to one or more species of salts comprising one or more species of alkali metal cations. The alkali metal salt may further comprise at least one of nitrate anions and nitrite anions. The alkali metal salt and the nitrate anions and/or nitrite anions may be present in the form of a molten salt. For example, one or more species of alkali metal cation may form the cation of the salt, while the nitrate anions or nitrite anions may form the anion of the salt. In some embodiments, the alkali metal salt of the shell comprises at least one of lithium cations, sodium cations, and potassium cations. In some embodiments, the alkali metal salt comprises all three of lithium cations, sodium cations, and potassium cations.

In some embodiments, the number of moles of alkali metal salts and of MgO may be present in the plurality of nanoclusters in certain proportions. For example, in some embodiments, the number of moles of alkali metal salts is from 5% to 25% of the number of moles of MgO.

In some embodiments, the plurality of nanoparticles may have a particular average length in their longest dimension. In some embodiments, a plurality of nanoclusters have an average length in their longest dimension of between about 50 and 150 nm, as determined by TEM measurement. The size of nanoclusters are determined by TEM measurement.

In some embodiments, the primary nanoparticles in the clusters grew into larger crystallite grains during formation. The crystallite grain growth of the primary nanoparticles resulted in the formation of colloidal nanoclusters with rough surfaces. In some embodiments, each of the nanoclusters comprises a plurality of crystallite grains that meet at a plurality of inner grain boundaries.

In some embodiments, the specific surface area of the nanoclusters may have a particular value as determined by BET. For example the specific surface area may be between about 25 and 50 $m^2 \cdot g^{-1}$, or between about 30 and 40 $m^2 \cdot g^{-1}$.

In some embodiments, the coated nanoclusters disclosed herein have a particular $CO_2$ uptake capacity. In some embodiments the coated nanoclusters have a $CO_2$ uptake capacity over 30 minutes, as measured in the presence of 100% dry $CO_2$ under ambient pressure at 340° C., of at least 2, 5, 7, 10, 12 mmol·$g^{-1}$ (mmol of $CO_2$ by 1 g of adsorbent). In some embodiments the coated nanoclusters have a $CO_2$ uptake capacity over four hours, as measured in the presence of 100% dry $CO_2$ under ambient pressure at 340° C., of at least 6, 8, 10, 13, or 16 mmol·$g^{-1}$.

According to some embodiments, different species of alkali metal cations in the shell of the coated nanocluster may be present according to different percentages by number of moles. For example, in some embodiments, lithium cations comprise from 20 to 40% of the number of moles of alkali metal cations; sodium cations comprise from 10 to 30% of the number of moles of alkali metal cations; and potassium cations comprises from 40 to 60% of the number of moles of alkali metal cations. Other ratios are also possible.

According to some embodiments, methods of manufacturing a plurality of coated nanoclusters are also generally described. Specific embodiments of the methods are also described in the included non-limiting examples, described further below.

According to one or more embodiments, the method of manufacturing may comprise reacting a first solution to synthesize a plurality of colloidal surfactant-coated nanoclusters. The synthesized plurality of colloidal surfactant-coated nanoclusters may comprise magnesium oxide (MgO). Reacting the first solution may comprise performing a non-hydrolytic sol-gel reaction. It may comprise alcoholysis followed by condensation.

The first solution may comprise a source of magnesium, surfactant, and diol species, in a non-aqueous solvent. In some embodiments, the source of magnesium comprises magnesium salts soluble in non-aqueous solvents. In some embodiments, the magnesium salts soluble in non-aqueous solvents comprise magnesium acetylacetonate dehydrate, magnesium acetate tetrahydrate, magnesium stearate, magnesium methoxide, and/or magnesium ethoxide. In some embodiments, the surfactant comprises fatty acid and/or fatty amine. In some embodiments, the fatty acid comprises oleic acid, sapienic acid, palmitoleic acid, myristoleic acid, elaidic acid, vaccenic acid, linoleic acid, caprylic acid, capric acid, lauric acid, myristic acid, palmitic acid, and/or stearic acid. In some embodiments, the fatty amine comprises oleyl amine, sapienyl amine, palmitoleyl amine, myristoleyl amine, elaidyl amine, vaccenyl amine, linoleyl amine, caprylyl amine, capryl amine, lauryl amine, myristyl amine, palmityl amine, and/or stearyl amine. In some embodiments, the diol species comprise 1,2-tetradecandiol, 1,2-hexadecanediol, 1,2-pentadecanediol, 1,2-dodecandiol, 1,2-undecanediol, 1,2-decanediol, 1,2-nonanediol, 1,2-octanediol, 1,2-heptanediol, 1,2-hexanediol, 1,2-pentandiol, 1,2-butanediol, 1,2-propanediol, and/or 1,2-etanediol. In some embodiments the non-aqueous solvent may comprise ether with the boiling point higher than 250° C. In some embodiments, the ether may comprise benzylether, polyethylene glycol monomethyl ether, tetraetylene glycol dimethyl ether, and/or polyethylene glycol dimethyl ether.

For example, referring to FIG. 1 which shows a process 100 for manufacturing coated nanoclusters, a first solution 105 may be reacted at step 110 to synthesize colloidal surfactant-coated nanoclusters 115 comprising MgO.

The methods may further comprise removing the surfactant from the plurality of colloidal surfactant-coated nanoclusters to produce a plurality of colloidal nanoclusters. The step of removing the surfactant may comprise calcinating the nanoclusters in air at from 400° C. to 600° C. for a certain period of time (e.g., six hours). For example, referring again to FIG. 1, nanoclusters 115 may be calcinated at step 120 to remove surfactants from the surface to produce a plurality of colloidal nanoclusters 125 that are surfactant-less.

The methods may further comprise dispersing the plurality of colloidal nanoclusters (now surfactant-less) in a second solution. The second solution may comprise an alcohol solvent (e.g., methanol) and at least one salt comprising alkali metal cations (e.g., lithium cations, sodium cations, potassium cations) and at least one of nitrate ($NO_3^-$) anions and nitrite ($NO_2^-$) anions dissolved in the second solution. Examples of salts include $LiNO_3$, $NaNO_3$, and $KNO_3$. $NaNO_2$, and $KNO_2$. Referring again to FIG. 1, the plurality of colloidal nanoclusters 125 that are surfactant-less may be dispersed into a second solution 135 comprising a solvent and at least one salt to form a suspension.

According to one or more embodiments, the second solution comprises $LiNO_3$, $NaNO_3$, and $KNO_3$. In such embodiments the makeup of salt may comprise $LiNO_3$ by from 20% to 40%, $NaNO_3$ by from 10% to 30%, $KNO_3$ from 40% to 60% by number of moles. According to one or more embodiments, the second solution comprises $LiNO_3$, $NaNO_2$, and $KNO_2$. In such embodiments the makeup of salt may comprise LiNO$_3$ by from 20% to 40%, NaNO$_2$ by from 10% to 30%, KNO$_2$ from 40% to 60% by number of moles.

The method may further comprise evaporating the alcohol solvent (e.g., methanol) to induce precipitation of a plurality of precursor coated nanoclusters. The method may further comprise re-dispersing the plurality of precursor coated nanoclusters in a suspension comprising a nonaqueous solvent (e.g., ethanol). For example as shown in FIG. 1, the solvent in suspension 135 may be evaporated and the resulting precursor coated nanoclusters may then be re-dispersed in a nonaqueous solvent (e.g., ethanol) to form a new suspension 145.

The method may further comprise an additional step of evaporating the non-aqueous solvent (e.g., ethanol) to provide a plurality of coated nanoclusters, each comprising: a core comprising MgO; and a shell surrounding the core, the shell comprising alkali metal salt, in turn comprising alkali metal cations and at least one of nitrate anions and nitrite anions. As shown in FIG. 1, the solvent of suspension 145 is evaporated at step 150 to produce the coated nanoclusters 155.

The coated nanoparticles described above and manufactured through processes such as the ones above may be used in applications for removing CO$_2$ from a gas stream. According to one or more embodiments, methods of removing CO$_2$ from a gas stream are generally provided. The method may comprise introducing the gas stream comprising CO$_2$ to a plurality of the coated nanoclusters, as described elsewhere herein, wherein the alkali metal salt of the shell is in a molten state. The method may further comprise adsorbing a portion of CO$_2$ from the gas stream onto the plurality of nanoclusters to produce a CO$_2$-reduced gas stream.

The step of adsorbing comprises reacting MgO with CO$_2$ to generate magnesium carbonate (MgCO$_3$). The step of adsorbing may occur within a particular temperature range, for example, from a temperature of from 250° C. to 350° C. The step of adsorbing may occur within a particular pressure range, for example, a pressure of from 0.8 bar to 1.2 bar, or at atmospheric pressure.

The following examples are intended to illustrate certain embodiments of the present invention, but do not exemplify the full scope of the invention.

EXAMPLES

Non-Limiting Example 1

This patent claims new CO$_2$ adsorbents based on MgO colloidal nanoparticle clusters coated with molten alkali-metal nitrate/nitrite salts for the next generation CO$_2$ capture and storage (CCS) system. The adsorbents invented achieved outstandingly high and rapid uptake of CO$_2$ in the presence of CO$_2$ under ambient pressure (1 bar) at moderate temperature around 300° C. (The uptake exceeds 11.7 mmol·g$^{-1}$ (514.8 mg CO$_2$ per 1 g of adsorbent) in 30 min at 340° C., and reaches 15.7 mmol·g$^{-1}$ (690.8 mg CO$_2$ per 1 g of adsorbent) in 4 h. Evaporation-induced methanol-mediated deposition of nitrate/nitrite salts on the nanoparticle clusters of MgO allowed the formation of unique core-shell type nitrate/nitrite coated MgO particles, resulting In the rapid uptake of extremely large amounts of CO$_2$ at moderate temperatures. The innovation contributes to the realization of compact and efficient CCS system to reduce plant costs.

MgO is a valid candidate for future advanced solid CO$_2$ adsorbents for both post-combustion CO$_2$ capture and pre-combustion CO$_2$ separation for its favorable operational temperature range for adsorption at intermediate temperatures of range—300° C.[17] and for its lower energy cost for regeneration (MgCO$_3$ (s)→MgO (s)+CO$_2$ (g); $\Delta H^0_r$(MgO)= 97.2 kJ mol$^{-1}$ at 450° C.) relative to other solid adsorbents (e.g. $\Delta H^0_r$ (CaO)~170 kJ mol$^{-1}$, $\Delta H^0_r$ (Li$_4$SiO$_4$)~142 kJ mol$^{-1}$). Recently, it has been discovered that the CO$_2$ uptake by MgO is accelerated dramatically by alkali metal nitrate coatings in the molten state. The significant enhancement in CO$_2$ reactivity was explained as being due to the role of molten nitrates in preventing the formation of a rigid CO$_2$-impermeable product layer of unidentate carbonates on the surface of MgO, and in promoting the generation of carbonate ions (CO$_3^{2-}$). However, the rate of CO$_2$ uptake and the loading capacity still should be further improved to the establish a versatile carbon capture and storage (CCS) system to reduce global CO$_2$ emissions and their negative impact on the global climate. For the development of further advanced CO$_2$ adsorbents, we have focused on colloidal nanoclusters of MgO. The colloidal nanoclusters with multiple inner grain boundaries and irregular surfaces are expected to contribute to an increase in the active surface area of MgO coated with thin layers of alkali metal salts. We have also concentrated on the effects of anion species in the salts to modify the reactivity with CO$_2$, and examined the differences of two types of alkali metal salts with different anion (nitrate and nitrite) compositions for the coatings on MgO nanoclusters.

Herein are disclosed high performance CO$_2$ adsorbents based on nanoparticle clusters of MgO coated with alkali metal salts. The CO$_2$ uptake exceeds 11.7 mmol·g$^{-1}$ over 30 min and reaches 15.7 mmol·g$^{-1}$ in 4 h in the presence of 100% dry CO$_2$ under ambient pressure at 340° C. The new adsorbents were prepared by the following steps. First, nanoparticle clusters of MgO are synthesized by a newly developed non-hydrolytic sol-gel reaction In a high-boiling point non-aqueous solvent (benzylether). Next, organic surfactants on the as-synthesized MgO nanoparticle clusters are removed by calcination in air at around 500° C. Then, thin layers of alkali metal salts are coated on the calcined MgO nanoparticle clusters by methanol evaporation-induced surface precipitation of the salts on a well-dispersed colloidal suspension of MgO nanoclusters in methanol in which the alkali metal salts are dissolved. Colloidal nanoclusters of MgO prepared by the new non-hydrolytic sol-gel reactions allow a dramatic increase in active surface area of MgO coated with thin layers of alkali metal salts, resulting in the fast generation of magnesium carbonate with high conversion ratio. Marked improvements in uptake reactivity and regenerability on introduction of nitrite salts in the coating layer are also noted and interpreted in terms of the formation of nitro and nitrato species on the MgO surfaces.

Figure 9:
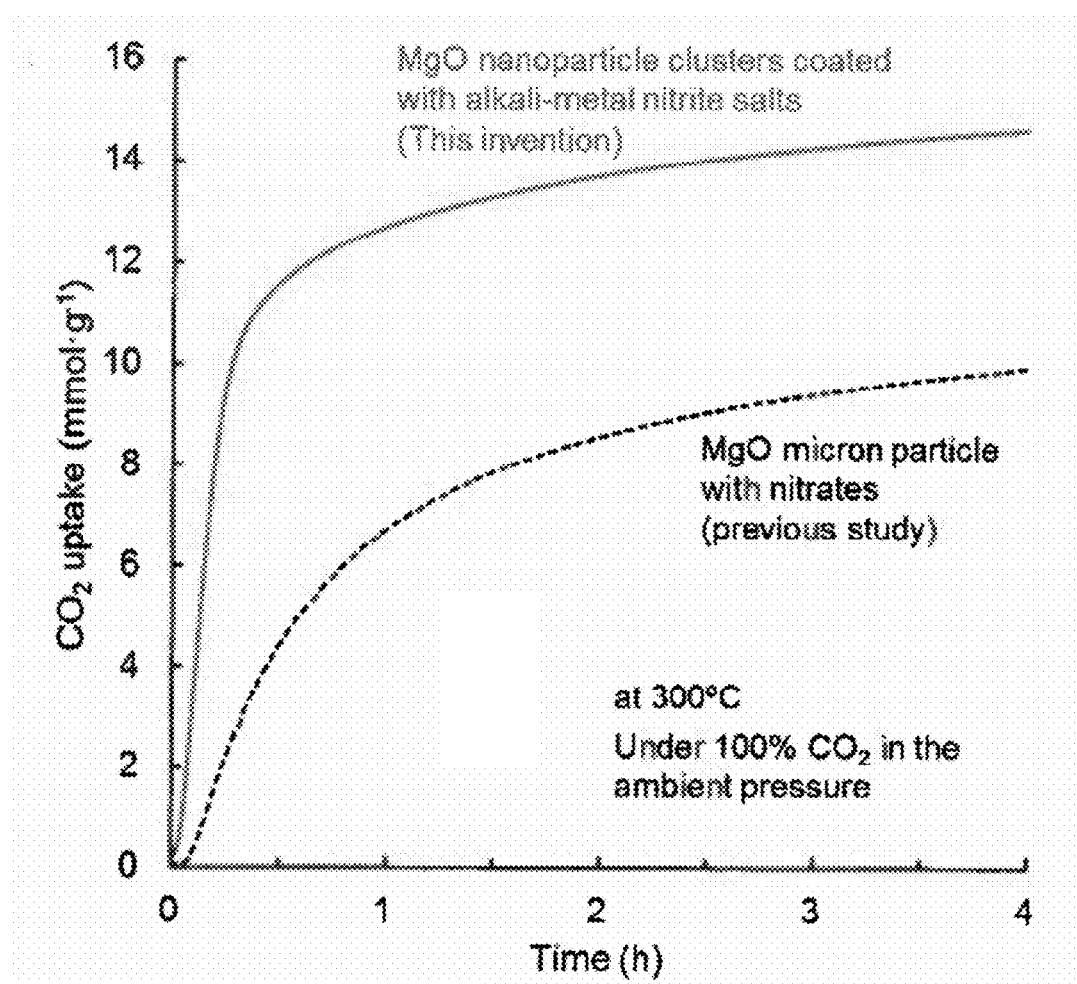
FIG. 9 is a graphical representation of $CO_2$ uptake capacity, according to one or more non-limiting embodiments.

FIG. 9 shows an example of CO$_2$ uptakes by the adsorbent invented here. It is clear that the new adsorbents show rapid uptake of high amounts of CO$_2$. The uptake exceeds 10 mmol g$^{-1}$ within 17 min under the flow of CO$_2$ at atmospheric pressure (1 bar) at 300° C., and the capacity reaches to 14.6 mmol·g$^{-1}$ after 4 h of exposure to CO$_2$. The optimum ratio of the amounts of nitrate/nitrite salts and CNCs of MgO, optimum size of CNCs of MgO, and the operative temperature for the CO$_2$ capture by the invented solid sorbents are described in Example 2. FIG. 9 shows CO$_2$ uptake by new adsorbents (alkali-metal nitrate-coated MgO nanoparticle clusters: 0.15.(LiNO$_3$)—(Na—K)NO2-MgO) and the uptake by conventional MgO-based adsorbents.

Non-Limiting Example 2

Colloidal nanoclusters of metal oxides constitute a promising new class of building blocks for a range of advanced functional materials. Herein is reported on the development of colloidal nanoclusters of MgO for $CO_2$ capture prepared by a novel non-hydrolytic sol-gel reaction followed by the deposition of alkali metal salts by methanol evaporation-induced surface precipitation. The $CO_2$ uptake exceeded 11.7 mmol $g^{-1}$ (514.8 mg $CO_2$ per 1 g of adsorbent) in 30 min in the presence of 100% dry $CO_2$ under ambient pressure (1 bar) at 340° C., and reached 15.7 mmol $g^{-1}$ (690.8 mg $CO_2$ per 1 g of adsorbent) in 4 h. Colloidal nanoclusters possessing multiple inner grain boundaries and rough surfaces allowed for a dramatic increase in active surface area of MgO coated with thin layers of alkali metal salts, and enabled the rapid conversion of MgO to $MgCO_3$ with high conversion ratio. It was also discovered that the $CO_2$ uptake loading and the regenerability of the sorbents can be enhanced on introduction of nitrite salts to the coating layer through the formation of magnesium nitro or nitrate species, which increased the critical thickness of product layers and mitigated the degradation of nanoclusters over the repeated sorption/desorption cycles.

Recent progress in advanced methods for nanoparticle synthesis and controlled assembly have opened up tremendous possibilities for the design of new functional materials. Colloidal nanoparticle clusters, which are also known as "colloidal atoms" or "supraparticles," in particular, are promising for their unique potential to deliver effective bio-separation media, highly active catalysts, strong surface plasmon resonance agents, bright fluorescent imaging elements, and high density magnetic storage media. Here, we report on the attractive features of colloidal nanoparticle clusters of magnesium oxide (MgO) coated with thin layers of alkali metal nitrates and nitrate/nitrite mixtures as a new class of $CO_2$ adsorbents that enable rapid uptake of significant amounts of $CO_2$ and regeneration at moderate temperatures (Abs. at ~300° C., Reg. at ~400° C.); these adsorbents show significant potential for the treatment of hot gaseous emissions and the effective utilization of medium and low temperature heat sources.

MgO may be used for solid $CO_2$ adsorbents for both post-combustion $CO_2$ capture and pre-combustion $CO_2$ separation because it has an operational adsorption range at intermediate temperatures (~300° C.) and has a low energy cost for regeneration ($MgCO_3$ (s)→MgO (s)+$CO_2$ (g); $\Delta H^0$=97.2 kJ·$mol^{-1}$ at 450° C.) relative to other representative metal oxide based adsorbents (e.g., $CaCO_3$(s)→CaO(s)+$CO_2$(g); $\Delta H^0$=~170 kJ $mol^{-1}$, $Li_2CO_3$(s)+$Li_2SiO_3$(s)→$Li_4SiO_4$(s)+$CO_2$(g); $\Delta H^0$=~142 kJ $mol^{-1}$). In some embodiments, $CO_2$ uptake by MgO can be accelerated dramatically when the particles are coated with alkali metal nitrates in their molten state. These significant enhancements in $CO_2$ reactivity may be attributed to the role played by the molten nitrates in preventing the formation of a rigid $CO_2$-impermeable product layer of unidentate carbonates on the MgO surfaces while promoting the generation of carbonate ions ($CO_3^{2-}$) in solution. Further improvements in $CO_2$ uptake rates and loading capacities aid in the establishment of a versatile carbon capture, utilization and storage (CCUS) system for the reduction of global $CO_2$ emissions and their adverse effect on the global climate.

Colloidal nanoclusters of MgO may aid in further development of advanced $CO_2$ adsorbents; these nanoclusters have multiple inner grain boundaries and rough surfaces that may contribute to a large active surface area for the MgO particles which may be coated with thin layers of alkali metal salts. The anion species (nitrate and nitrite) in the salts used to coat the nanoparticles may modify the overall reactivity of MgO with $CO_2$.

In some embodiments, colloidal nanoclusters of MgO were prepared by a newly developed one-step non-hydrolytic sol-gel process in a high-boiling point non-aqueous solvent (benzylether), followed by calcination in air to remove the surfactants. The alkali metal salt coatings on the MgO nanoclusters were introduced by methanol evaporation-induced surface precipitation of the salts from a well-dispersed colloidal suspension of MgO nanoclusters in a methanol solution of dissolved alkali metal salts. Sample characterization was performed by using TEM, XRD, and FT-IR. The $CO_2$ uptake of the samples was measured by thermogravimetric analysis (TGA) by following the isothermal variation in weight of the adsorbents placed in a flowing stream of dry $CO_2$ at ambient pressure (1 bar).

1. EXPERIMENTAL SECTION 2.1 Materials. Magnesium acetylacetonate dehydrate (Mg(acac)$_2$.2$H_2O$, 98%), 1,2-tetradecandiol ($CH_3(CH_2)_{11}CH(OH)CH_2OH$, 90%), oleic acid ($CH_3(CH_2)_7CH=CH(CH_2)_7COOH$, 90%), oleylamine ($CH_3(CH_2)_7CH=CH(CH_2)_7CH_2NH_2$, 70%), benzyl ether (($C_6H_5CH_2)_2O$, 98%), lithium nitrate ($LiNO_3$, Reagent-Plus), sodium nitrate ($NaNO_3$, 99%), sodium nitrite ($NaNO_2$, 97%), potassium nitrate ($KNO_3$, 99%), and potassium nitrite ($KNO_2$, 96%) were purchased from Sigma-Aldrich. Methanol ($CH_3OH$, anhydrous, MACRON AR® ACS Reagent grade), ethanol ($C_2H_5OH$, 200 proof anhydrous, KOPTEC, 99.5%), and hexane ($H_3C(CH_2)_4CH_3$, MACRON AR® ACS Reagent grade) were purchased from VWR. All chemicals were used as received without further purification. The amounts of chemicals used for the synthesis of colloidal nanoclusters of MgO compensated for the purity of the reagents.

2.2 Sample preparation. Colloidal nanoclusters of MgO were prepared by a non-hydrolytic sol-gel reaction in a high-boiling point non-aqueous solvent in the presence of two types of surfactants (oleic acid and oleyl amine), with subsequent calcination for surfactant removal. In a typical procedure, 20 mmol of magnesium acetylacetonate dehydrate, 20 mmol of 1,2-tetradecandiol, 10 mmol of oleic acid, and 20 mmol of oleylamine were mixed with 20 mL of benzyl ether in a 100 mL 3-neck flask. The mixture was stirred vigorously under flowing nitrogen and heated at 200° C. for 2 h, followed by reflux at 300° C. for 1 h. The solution was then cooled to room temperature and centrifuged after methanol was added. The precipitants were rinsed with hexane, re-centrifuged after the addition of ethanol, and dried overnight at room temperature. The as-synthesized MgO nanoclusters were calcined at 500° C. in air for 6 h to remove the organic surfactants on the surfaces of the nanoclusters. The calcined MgO nanoclusters were dispersed in either a methanol solution in which a ternary mixture of alkali metal nitrates was dissolved to prepare (Li—Na—K)$NO_3$-coated MgO with [$LiNO_3$]:[$NaNO_3$]:[$KNO_3$]=0.30:0.18:0.52, or in a solution with a mixture of lithium nitrate, and sodium and potassium nitrites for the preparation of $LiNO_3$—(Na—K)$NO_2$-coated MgO ([$LiNO_3$]:[$NaNO_2$]:[$KNO_2$]=0.30:0.18:0.52). Typically, 1.5 mmol of calcined MgO clusters were dispersed in 20 mL of methanol solution with the dissolved alkali metal salts. The mixture was ultrasonicated to obtain a well-dispersed colloidal suspension of MgO nanoclusters, followed by evaporation of the methanol solvent at 50° C. under vigorous stirring in a rotary evaporator to deposit the alkali metal salts on the surfaces of the MgO nanoclusters. The dried particles were re-dispersed in 5 mL of ethanol, dried overnight again in the oven at 90° C., and ground with an agate mortar to obtain the final product.

2.3 Sample characterization and analysis of $CO_2$ uptake. The size and morphology of the nanoclusters were characterized by transmission electron microscopy (TEM: JEOL® JEM-2010). The phase composition and crystallographic structure of each sample was examined by powder X-ray diffractometry (XRD: PANalytical® X'Pert Pro Multipurpose Diffractometer). The average size of the crystal domains in the nanoclusters (D) was evaluated from the half-band width of the peak in the XRD spectra through the Scherrer equation ($D=K\lambda/(\beta \cos \theta)$, where K is the Scherrer constant for spherical particles (=0.9), $\lambda$ is the X-ray wavelength (1.54060 Å), $\beta=\sqrt{B^2-b^2}$, B is the full-width at half-maximum (FWHM) of the diffraction peak, b is the instrumental line broadening and $\theta$ is the Bragg angle). Textural features of the particles were examined on a BET surface area and porosimetry system (BET: Micromeritics® ASAP 2020). Molecular species on the samples were analyzed by Fourier transform infrared spectroscopy (FT-IR: Nicolet® NEXUS 470). $CO_2$ uptake by the nanocluster adsorbents was determined by isothermal weight variations in samples immersed in the flow of dry $CO_2$ at ambient pressure (1 bar), as measured by thermogravimetric analysis (TGA: TA Instruments® TGA-Q50). Concentration of $CO_2$ in the flow gas was regulated by mixing 100% dry $CO_2$ with 100% dry nitrogen, and the concentration was confirmed by iSense $CO_2$ monitor (CO2Meter Inc. NEMA4). All samples were precalcined at 450° C. for 1 h under the flow of nitrogen in the TGA sample chamber to remove preadsorbed species (atmospheric $CO_2$, water, etc.) on the samples prior to $CO_2$ uptake measurements.

2. RESULTS AND DISCUSSION

Figure 2:
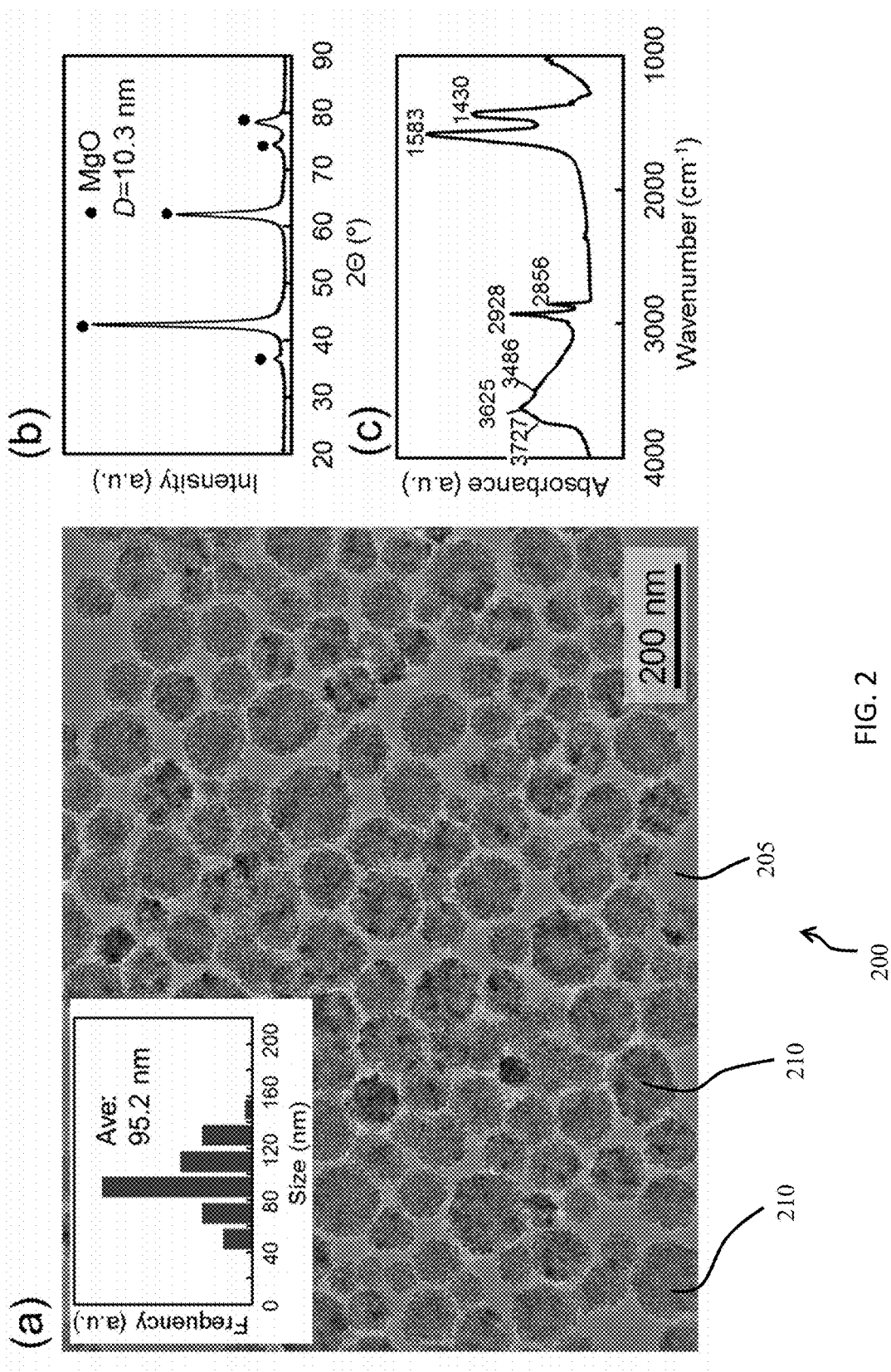
FIG. 2 shows colloidal nanoclusters, according to one or more non-limiting embodiments.

FIG. 2 shows colloidal nanoclusters of MgO as-synthesized by non-hydrolytic sol-gel reaction. FIG. 2(a) shows a TEM image 200 of nanoclusters 210 and size distribution (inset), FIG. 2(b) shows XRD spectra, where D is the average size of the crystal domains indicated by the Scherrer equation, and FIG. 2(c) shows FT-IR spectra of the clusters. FIG. 2(a) shows a TEM image of colloidal nanoclusters of MgO synthesized via the non-hydrolytic sol-gel reaction procedure. It is clear that spherical colloidal nanoclusters with sizes ranging from 40 nm to 160 nm (~95 nm average) were generated. The size of the primary nanoparticles comprising the colloidal clusters was about 10 nm on average. There was no secondary aggregation of the clusters nor was there inter-cluster coalescence. FIGS. 2(b) and (c) show XRD and FT-IR spectra of the colloidal nanoclusters, respectively. The XRD spectrum reveals that the colloidal nanoclusters were comprised of well-crystallized single phase 10 nm MgO nanoparticles (consistent with the TEM observations), and that no intermediate products, such as magnesium hydroxides or residual starting materials, were incorporated in the nanoparticles. In the FT-IR spectrum, peaks ascribed to C—H stretching vibrations for alkyl-chains (—$CH_2$—) at 2928 $cm^{-1}$ and 2856 $cm^{-1}$, and C=O stretching vibrations for carboxylates ($COO^-$) at 1583 $cm^{-1}$ (asymmetric) and 1431 $cm^{-1}$ (symmetric) are identified. The appearance of these peaks suggests that the MgO nanoparticles in the clusters were protected by deprotonated carboxylate molecules (R—$COO^-$). A shoulder at ~3700 $cm^{-1}$ and peaks at 3620 $cm^{-1}$ and 3477 $cm^{-1}$ are also identified in the FT-IR spectrum; these absorbances are ascribed to O—H stretching vibrations for 3-, 4- and 5-coordinated hydroxyl groups. The result indicates that the oxygen sites at the surface plane, edge and corner of MgO particles were partially protonated. The absence of a sharp peak in the range between 3720 and 3780 $cm^{-1}$ suggests that 1-coordinated hydroxyl species (—OH group coordinated directly to magnesium sites on the surface of MgO) were not generated on the MgO nanoparticles.

Figure 3:
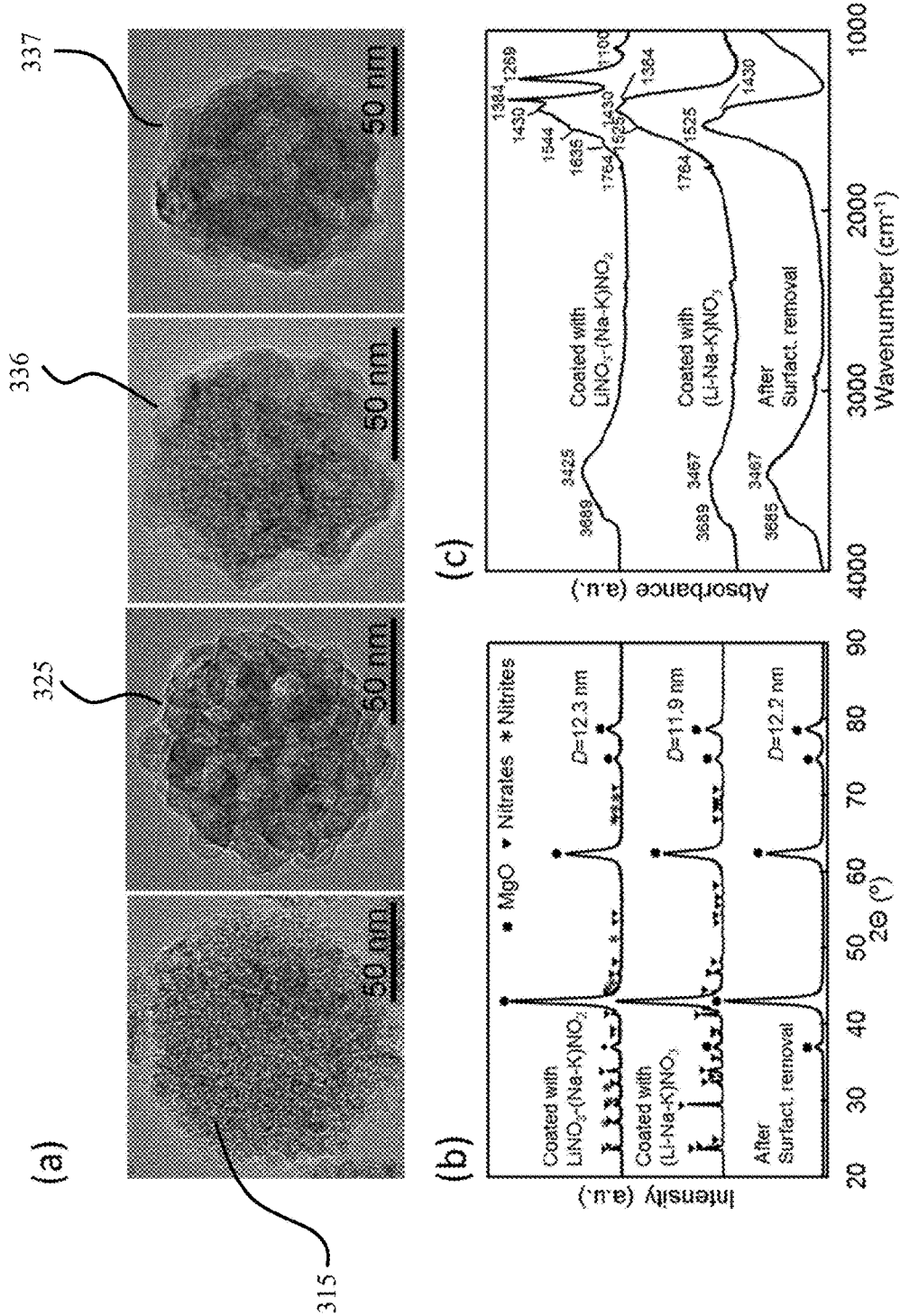
FIG. 3 shows variations in colloidal nanoclusters of MgO following surfactant removal, according to one or more non-limiting embodiments.

FIG. 3 shows variations in colloidal nanoclusters of MgO following surfactant removal by calcination in air at 500° C. for 6 h and surface coating with 15 mol % (Li—Na—K)$NO_3$ and $LiNO_3$—(Na—K)$NO_2$ by methanol evaporation-induced salt precipitation on the calcined nanoclusters in (a) TEM images of colloidal nanoclusters 315 of MgO as synthesized with surfactant still present, nanoclusters after surfactant removal 325, coated nanoclusters 336 comprising an (Li—Na—K)$NO_3$ shell, and coated nanoclusters 337 comprising an $LiNO_3$—(Na—K)$NO_2$ shell (b) XRD spectra, and (c) FT-IR spectra. FIGS. 3 (a)-(c) show the variations in morphology, crystallographic phase compositions and surface species of the colloidal nanoclusters of MgO after the surfactants were removed by calcination and the particles were coated with alkali metal nitrates ((Li—Na—K)$NO_3$) or nitrate/nitrites ($LiNO_3$—(Na—K)$NO_2$). The TEM images shown in FIG. 3(a) reveal that the primary nanoparticles in the clusters grew into larger grains on calcination for surfactant removal. The grain growth of the primary nanoparticles resulted in the formation of colloidal nanoclusters with rough surfaces. Nevertheless, there were no significant variations in the size of the clusters nor was there inter-cluster coalescence during calcination. The textural features of the colloidal nanoclusters after the calcination were also examined in terms of the BET surface area and porosimetry. The average size of the grains and the pores determined by BET were 162.4 nm and 15.1 nm, respectively. The size of the grains was slightly larger than that determined by TEM, a discrepancy that may be due to the influence of weak aggregation between the nanoclusters. The pore size in the nanoclusters determined by BET was consistent with the morphological features identified by TEM. The specific surface area of the nanoclusters determined by BET was 37.0 $m^2 \cdot g^{-1}$. It is considered that the roughness of the surface of the nanoclusters contributed to the increase of the specific surface area. During the deposition of the alkali metal nitrates or nitrate/nitrites mixture, the salts precipitated as a thin layer on the surfaces of the MgO nanoclusters. Since no independent crystals of the nitrate or nitrite salts are identified in the TEM images, it is concluded that precipitation of the salts initiated preferentially on the MgO nanocluster surfaces under our experimental conditions. XRD results shown in FIG. 3(b) indicate that the single phase cubic structure of MgO was maintained even after the calcination step, and that the clusters were coated with well-crystallized nitrates or nitrate/nitrite salts after the coating treatment. In the FT-IR spectra shown in FIG. 3(c), the post-calcination clusters yielded only traces of the peaks for alkyl-chains at around 2928 $cm^{-1}$ and 2856 $cm^{-1}$, indicating that most of the organic surfactants on MgO were decomposed and removed by the calcination in air. Peaks for the carboxylate groups identified in the spectrum of as-synthesized MgO nanoclusters were merged into a single deformed peak with a maximum at 1525 $cm^{-1}$ and a shoulder at 1438 $cm^{-1}$ following calcination. The maximum and the shoulder correspond to asymmetric and symmetric stretching vibrations of unidentate carbonates, respectively. The peak deformation suggests that the organic surfactants with carboxylate groups were decomposed during the calcination step, and that new carbonate species were generated that coordinated chemically on the MgO surface. Following the deposition of (Li—Na—K)NO$_3$, a peak ascribed to N—O stretching vibration for nitrate (NO$_3^-$) groups appeared at 1384 cm$^{-1}$. For the case of LiNO$_3$—(Na—K)NO$_2$, two peaks ascribed to N—O stretching vibrations were observed at 1384 cm$^{-1}$ and 1269 cm$^{-1}$ for the nitrate (NO$_3^-$) and nitrite (NO$_2^-$) groups, respectively. In the spectrum for the clusters coated with LiNO$_3$—(Na—K)NO$_2$, other peaks and shoulders appeared at 1635 cm$^{-1}$, 1540 cm$^{-1}$, and 1100 cm$^{-1}$, ascribed to asymmetric and symmetric stretching vibrations for nitro (Mg—NO$_2$) or nitrato (Mg—O—NO$_2$, Mg—O$_2$NO, (Mg—O)$_2$=NO) species, indicating that the nitrite salts reacted with MgO chemically to form several surface species of MgO—NO$_x$ on MgO.

Figure 4:
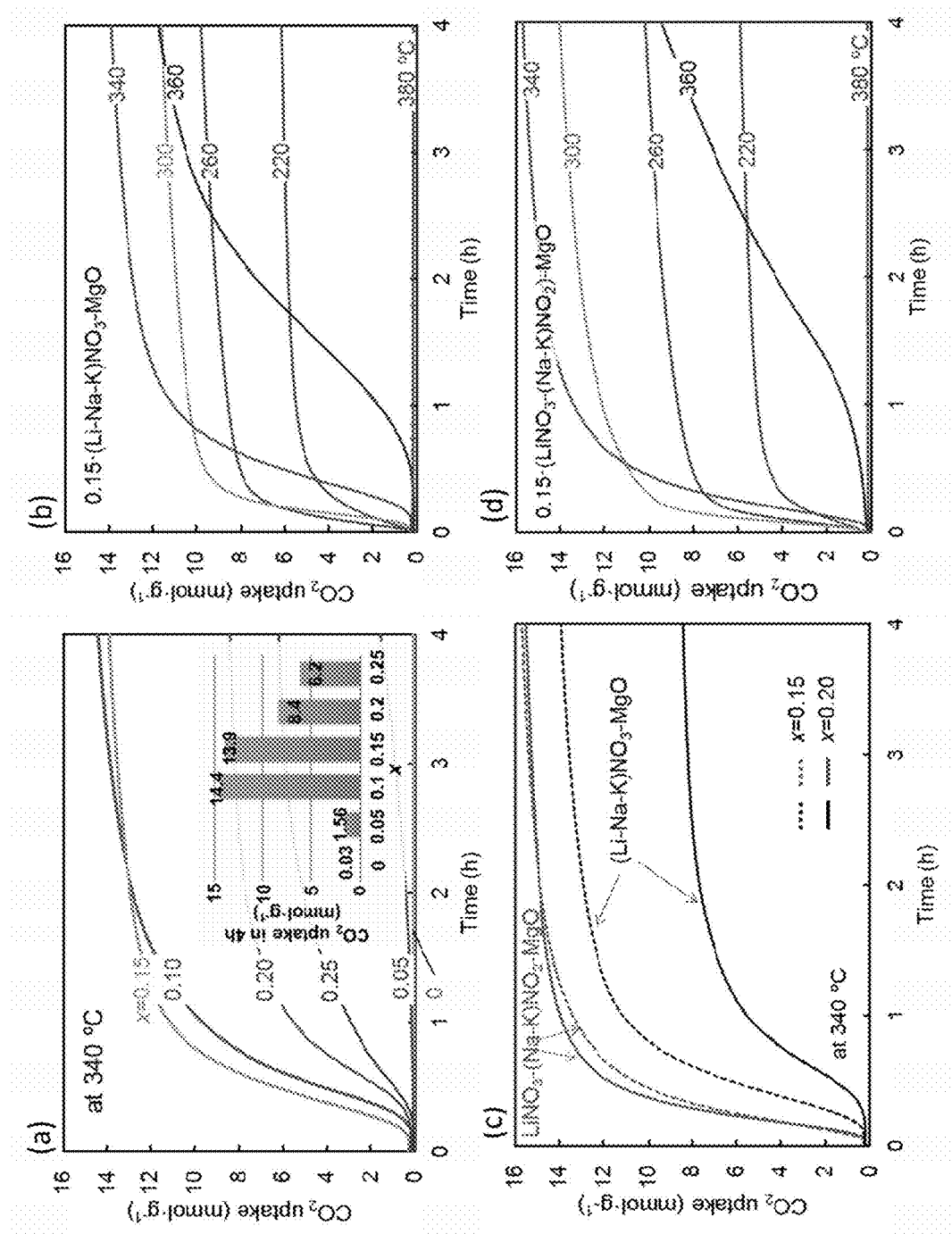
FIG. 4 shows $CO_2$ uptake, according to one or more non-limiting embodiments.

FIG. 4 shows CO$_2$ uptake by (Li—Na—K)NO$_3$— and LiNO$_3$—(Na—K)NO$_2$-coated colloidal nanoclusters of MgO in 100% CO$_2$ at atmospheric pressure (1 bar), where (Li—Na—K)NO$_3$ and LiNO$_3$—(Na—K)NO$_2$ represent ternary mixture of the nitrates ([LiNO$_3$]:[NaNO$_3$]:[KNO$_3$]= 0.30:0.18:0.52) and the mixture of LiNO3 and (Na—K)NO2 at the same cation ratio ([LiNO3]:[NaNO$_2$]:[KNO$_2$]=0.30:0.18:0.52), respectively. FIG. 4(a) shows uptake by (Li—Na—K)NO$_3$-coated colloidal nanoclusters of MgO at 340° C. with different amounts of the coatings, and the loading capacities in 4 h (inset); FIG. 4 (b) shows uptake by 15 mol % (Li—Na—K)NO$_3$-coated colloidal nanoclusters of MgO (0.15.(Li—Na—K)NO$_3$—MgO) at different temperatures; FIG. 4(c) shows a comparison of the uptake at 340° C. by (Li—Na—K)NO$_3$-coated colloidal nanoclusters of MgO and by LiNO$_3$—(Na—K)NO$_2$-coated colloidal nanoclusters of MgO; (d) Uptake by 15 mol % LiNO$_3$—(Na—K)NO$_2$-coated colloidal nanoclusters of MgO (0.15.(LiNO$_3$—(Na—K)NO$_2$)—MgO) at different temperatures. FIGS. 4(a)-(d) summarize the CO$_2$ uptake performance of MgO nanoclusters coated with alkali metal nitrates and nitrate/nitrite mixtures in 100% CO$_2$ at atmospheric pressure (1 bar). The uptake at 340° C. by the nitrates-coated MgO nanoclusters (x(Li—Na—K)NO$_3$—MgO) with different amounts (x) of nitrate salts is shown in FIG. 4 (a). Here, the proportions of the three cations in the nitrates were fixed at [Li]:[Na]:[K]= 0.30:0.18:0.52. The results demonstrate that the CO$_2$ uptake by MgO nanoclusters was improved dramatically by the nitrate salt coatings. In contrast to the quite low uptake of 0.03 mmol g$^{-1}$ after 4 h of reaction with CO$_2$ by the MgO nanoclusters without salt coatings (x=0), the uptake by MgO clusters with x=0.10 exceeded 14.4 mmol g$^{-1}$ under the same reaction conditions and exposure time. For the nitrates-coated MgO nanoclusters, the uptake quickly leveled off at a low value (<0.3 mmol g$^{-1}$) during the first few minutes of the reaction, but then changed course and rose rapidly before once again leveling off at an unusually high CO$_2$ loading. For the 15 mol % nitrates-coated MgO nanoclusters (x=0.15), the uptake loading in 4 h was 13.9 mmol g$^{-1}$, which is slightly lower than the value obtained for the x=0.10 nanoclusters, but the transition to the accelerating regime occurred earlier than for the x=0.10 particles, and the overall uptake of CO$_2$ was larger during the first hour or so. FIG. 4(b) shows the CO$_2$ uptake by 15 mol % nitrates-coated MgO nanoclusters (x=0.15) at different temperatures. The highest uptake loading was recorded at 340° C. However, the lead time to initiate the transition to an accelerating regime was shorter for lower temperatures. The differences in the uptake by the clusters with different anion compositions in the salt coatings are demonstrated in FIG. 4(c). It is clear that the nitrate/nitrite-coated MgO nanoclusters exhibited higher and faster uptake of CO$_2$ than did the nitrate-coated MgO nanoclusters at the same salt content. For the case of 20 mol % nitrate/nitrite-coated MgO nanoclusters (x=0.20), the uptake exceeded 11.8 mmol g$^{-1}$ in 30 min, and reached 15.5 mmol g$^{-1}$ in 4 h. These results indicate that the CO$_2$ uptake was enhanced by the introduction of nitrite salts to the coatings. FIG. 4(d) shows the CO$_2$ uptake by 15 mol % nitrate/nitrite-coated MgO nanoclusters (x=0.15) at different temperatures. As with the uptake by the nitrates-coated MgO, the highest uptake loading of CO$_2$ was recorded at 340° C. (15.7 mmol g$^{-1}$ in 4 h), and again the lead time to initiate the transition to an accelerating regime was shortened as the temperature was decreased. At 380° C., there was no transition to faster CO$_2$ uptake, and the loading after 4 h exposure was very low, at 0.2 mmol g$^{-1}$.

Figure 5:
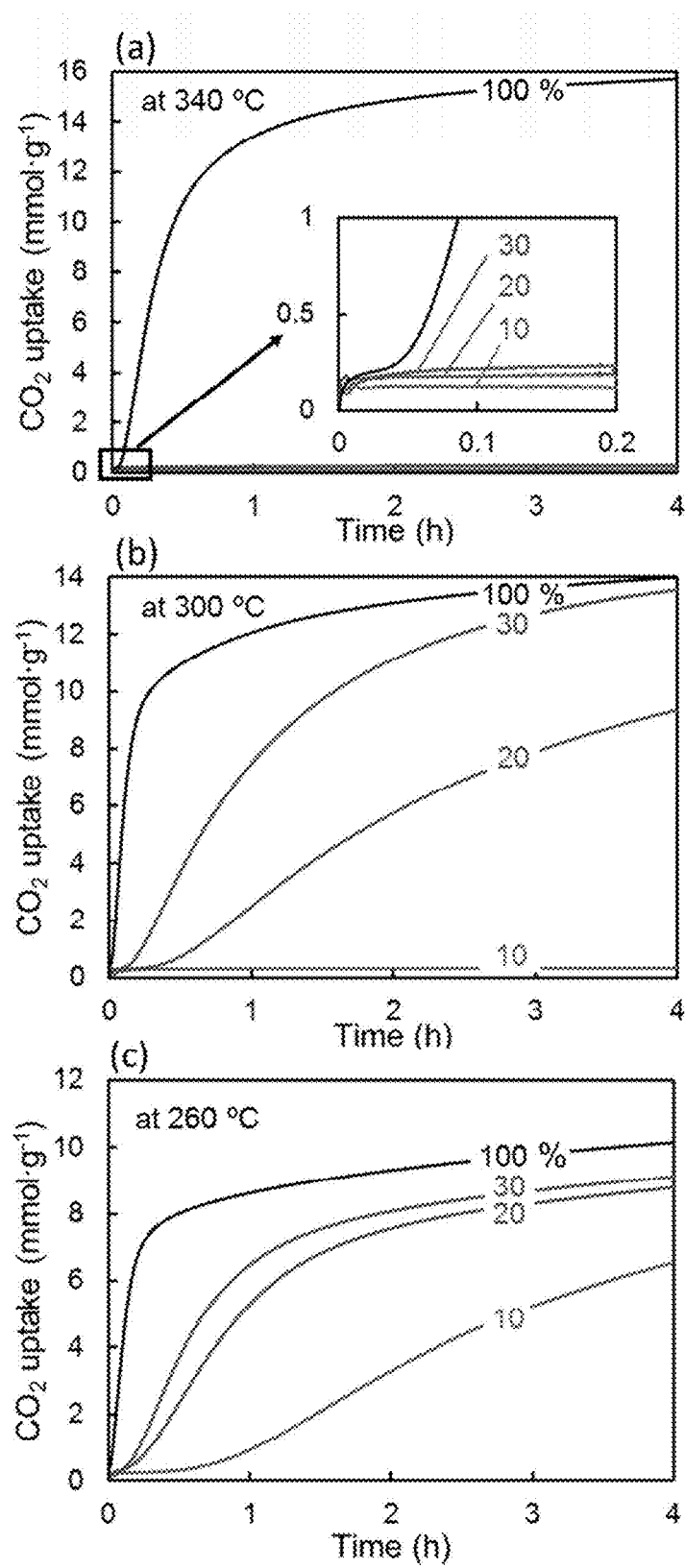
FIG. 5 shows $CO_2$ uptake, according to one or more non-limiting embodiments.

FIG. 5 shows CO$_2$ uptake by 0.15.(LiNO$_3$—(Na—K)NO$_2$)—MgO in the flow gas at different concentrations of CO2 under atmospheric pressure (1 bar). (a) at 340° C.; (b) 300° C.; (c) 260° C. The influence of CO$_2$ concentration in the flow gas on the variations in uptake by 15 mol % LiNO$_3$—(Na—K)NO$_2$-coated colloidal nanoclusters of MgO was examined at three different temperatures (340° C., 300° C., and 260° C.), as shown in FIGS. 5(a)-(c). The uptake was lower with decreasing concentration of CO$_2$ in the flow gas, but the variations depended strongly on the temperature. At 340° C., the uptake with low concentrations of CO$_2$ (<30%) did not exceed a loading of 0.3 mmol·g$^{-1}$. No transition from the first plateau regime to an accelerating increase occurred. At 300° C., however, high loadings were obtained, even in 30% and 20% CO$_2$. With decreasing CO$_2$ concentration, the lead time to initiate an accelerating increase from the first plateau regime was prolonged and the rate of uptake was moderated. At 260° C., the transition to an accelerating regime occurred even in 10% CO$_2$, and the uptake exceeded 6 mmol·g$^{-1}$ by 4 h of the reaction.

Figure 6:
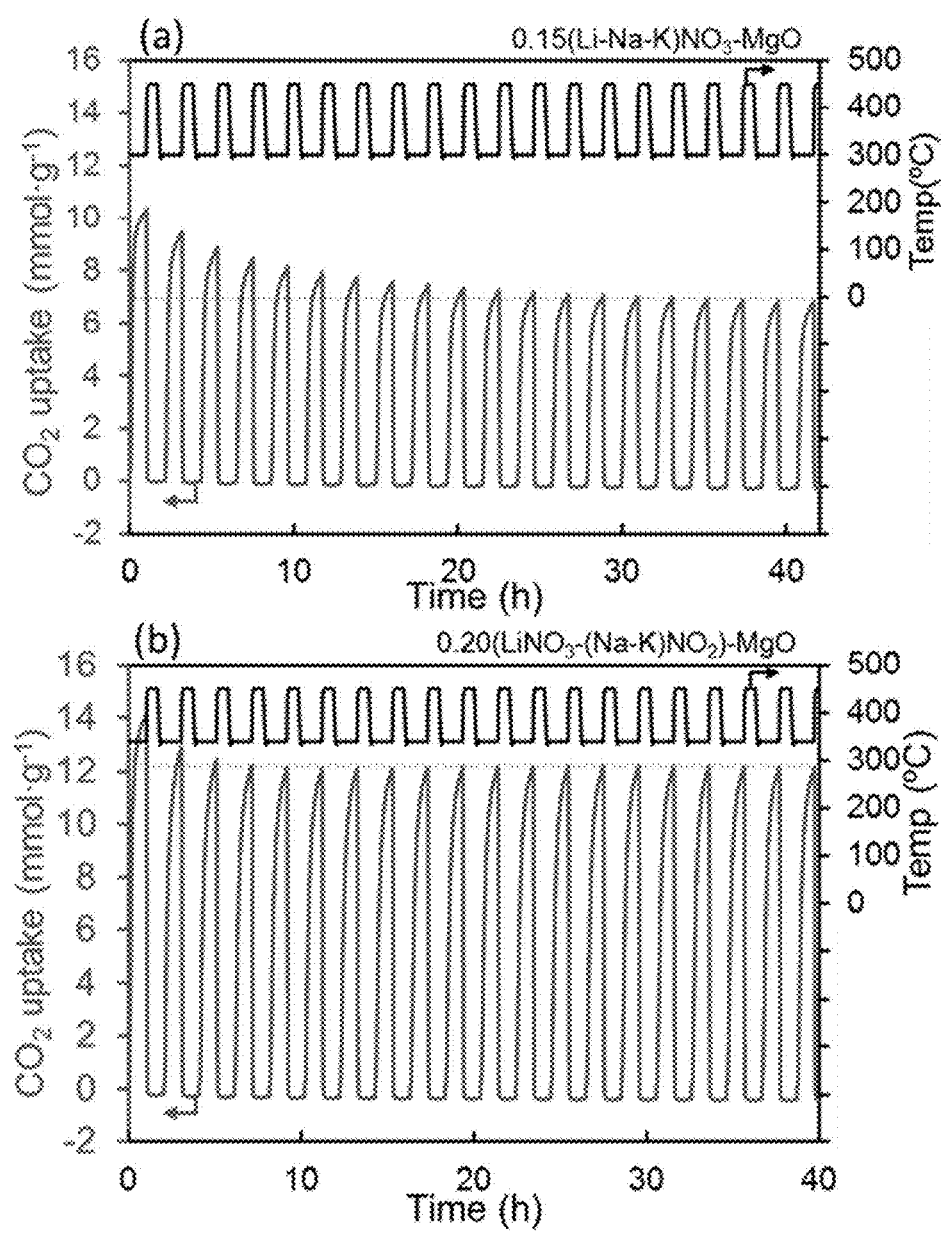
FIG. 6 shows $CO_2$, according to one or more non-limiting embodiments.

FIG. 6 shows CO$_2$ uptake over repeated cycles of CO$_2$ adsorption in 100% CO$_2$ and desorption in 100% N$_2$ by (a) 0.15.(Li—Na—K)NO$_3$—MgO and (b) 0.20.(LiNO$_3$—(Na—K)NO$_2$)—MgO. The cyclic stability attained after a few repeated adsorption/desorption steps is indicated by the dotted lines. The regenerability and stability of the nitrates or nitrate/nitrites-coated MgO nanoclusters were examined by following the cyclic CO$_2$ uptake and release profiles of 15 mol % nitrates-coated MgO and 20 mol % nitrate/nitrites-coated MgO, as shown in FIGS. 6(a) and (b). Here, the release of CO$_2$ to a flowing 100% N$_2$ stream was conducted at 450° C. In both cases, the loading of CO$_2$ initially decreased with an increasing number of CO$_2$ uptake and release cycles, but, the degradation with each cycle diminished gradually, and the uptake after a number of cycles showed good regenerability of the adsorbents with minimal further degradation. In particular, for the case of nitrate/nitrites-coated MgO nanoclusters, the deterioration occurred only during the first few (~4) cycles and the uptake loadings during the later cycles remained at 86% of the initial value, exhibiting excellent regenerability and stability of the nanoclusters.

Figure 7:
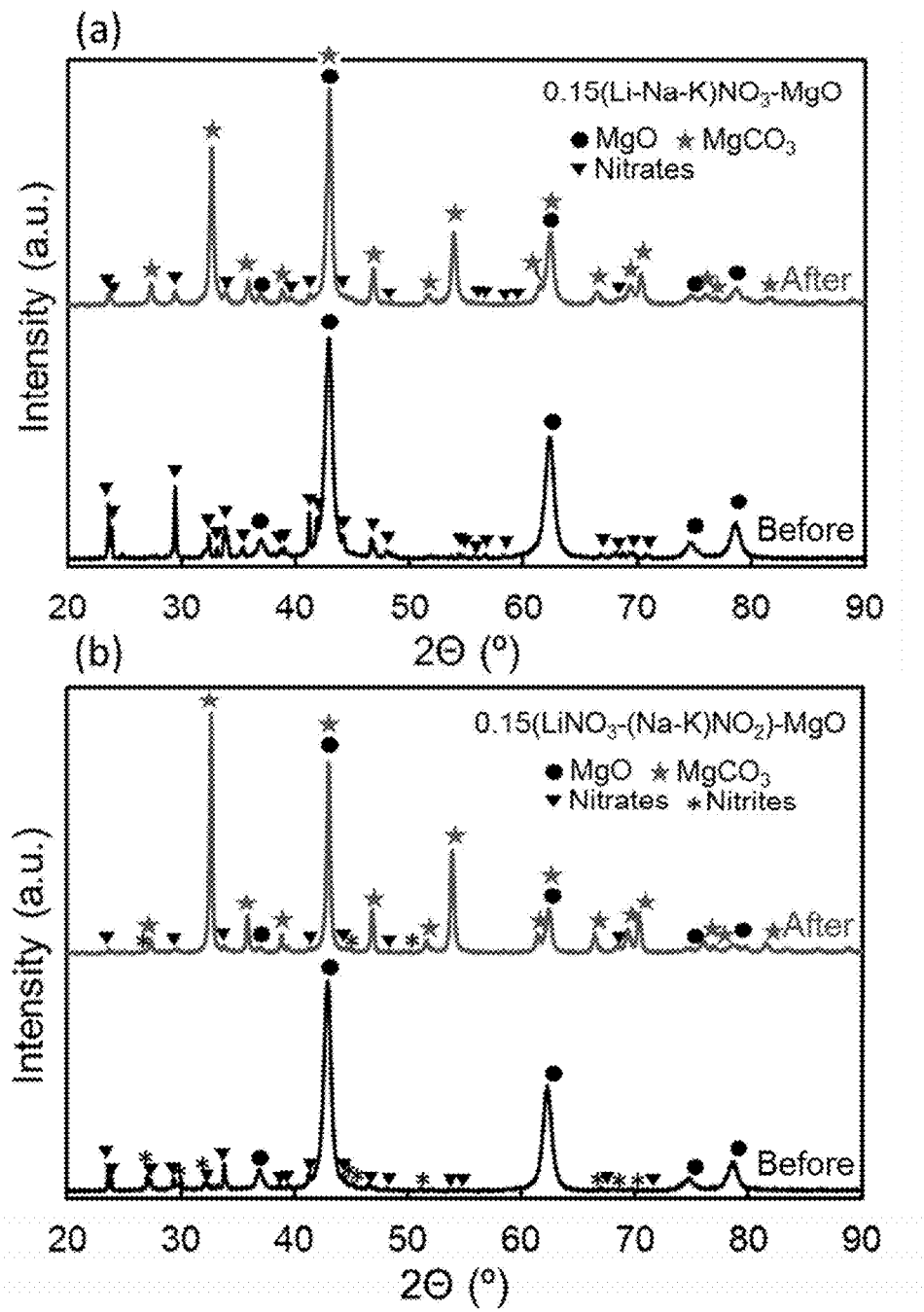
FIG. 7 shows XRD Spectra of the colloidal nanoclusters of MgO coated with nitrate or nitrate/nitrite salts, according to one or more non-limiting embodiments.

FIG. 7 shows XRD Spectra of the colloidal nanoclusters of MgO coated with nitrate or nitrate/nitrite salts before and after the reaction with CO$_2$ for 4 h in 100% CO$_2$ at atmospheric pressure (1 bar). (a) 0.15.(Li—Na—K)NO$_3$—MgO and (b) 0.15.(LiNO$_3$—(Na—K)NO$_2$)—MgO. These results reveal that a rapid uptake of CO$_2$ with high final sorbent loadings can be achieved at moderate temperatures around 300° C. with colloidal nanoclusters of MgO coated with alkali metal salts, and that the uptake can be enhanced by the addition of nitrite salts to the salt coatings. As discussed in our previous paper, the coatings of alkali metal salts tend to prevent the formation of a $CO_2$-impermeable rigid surface layer on the MgO surface, and promote the rapid conversion of MgO to $MgCO_3$. The formation of $MgCO_3$ after the reaction with $CO_2$ for both nitrate- and nitrate/nitrite-coated MgO was confirmed by XRD, as shown in FIG. 7; no other byproducts were indicated by these spectra. Colloidal nanoclusters of MgO prepared by the newly-developed non-hydrolytic sol-gel/calcination process reported here provide nanoscale MgO grains with irregular surfaces and multiple inner grain boundaries that provide a large active surface area for the MgO nanoparticle clusters that are coated with thin layers of alkali metal salts. The $CO_2$ adsorption process occurs by the initial dissolution of the $CO_2$ in the coating salt layer, which is in the molten state at the operating temperature for $CO_2$ adsorption. MgO is also dissolved partially to generate $Mg^{2+}$ and $O^{2-}$ ions in the molten salt coating layers. Subsequently, the dissolved $CO_2$ reacts with $O^{2-}$ to generate the carbonate ions ($CO_3^{2-}$) in the salt layer. The concentration of the carbonate ions increases gradually, and when it exceeds a threshold required for the nucleation and growth of the crystals of $MgCO_3$, the uptake begins to increase at an accelerating rate. The uptake rate eventually begins to slow, and does so until the sorbent capacity is reached at which point no further adsorption occurs. The decelerating trend is due to the lowering of the overall reaction rate, which is controlled by the diffusion of oxygen anions and carbonate ions through the pre-generated $MgCO_3$ layers. The plateau value is lower than the theoretical maximum ($c_{max}$) for the $CO_2$ uptake based on the stoichiometry of the reaction of MgO with $CO_2$ (MgO (s)+$CO_2$ (g)→$MgCO_3$ (s)), which is written as, $$c_{max} = \left(\frac{1000}{M_{MgO} + M_{salts} \cdot x}\right) [mmol \cdot g^{-1}] \quad (1)$$

where, $M_{MgO}$ and $M_{salts}$ are the molecular weights of MgO and alkali metal salts (average), respectively. The result suggests the existence of a critical thickness in the product layer at which the diffusion of reactants is inhibited, as reported for the reaction of CaO with $CO_2$. The $CO_2$ reaction rate varies with the amount of the salts present. For the nitrates-coated MgO nanoclusters, the fastest rate of uptake was observed for a salt molar ratio of 15 mol % in the composite MgO particles. The decrease in the reaction rates with decreasing amounts of the salts may be attributed to an imperfect surface coverage of the MgO by the salts. In contrast, when the MgO nanoclusters are coated with excess salts, the lead time to accumulate the carbonate ions ($CO_3^{2-}$) in the salts to a threshold concentration for the nucleation and growth of $MgCO_3$ crystals is prolonged.

Figure 8:
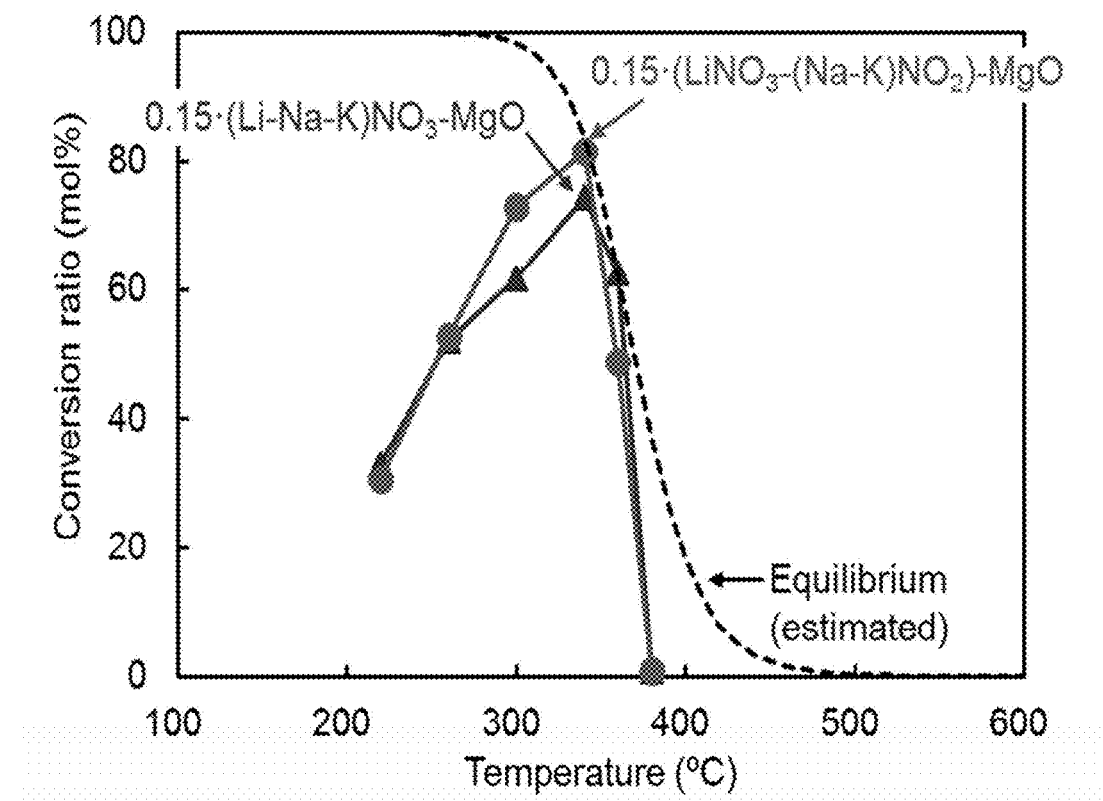
FIG. 8 is a graphical representation of a relationship between conversion ratio and temperature, according to one or more non-limiting embodiments.

The uptake performance is also affected strongly by the temperature and concentration of $CO_2$ in the flow gas used for the $CO_2$ adsorption. A shorter lead time is required to initiate the accelerating phase in the uptake curves at lower reaction temperatures. Since $CO_2$ gas solubility in the molten salts increases with decreasing temperature, $CO_2$ can be dissolved in the molten salts more readily at the lower temperatures, and the threshold concentration at which the accelerating phase begins is attained more rapidly. On the other hand, the uptake plateaus at lower values at the lower temperatures, with a resulting decrease in the final uptake capacity below 340° C. Slower kinetics at the lower temperatures must be one of the factors responsible for the lowering of the uptake capacities at these temperatures. In addition, the decrease in the critical thickness of the product layers may also cause a lowering of the capacity at low temperatures since, under these conditions, the product layer is generated as dense crystals of $MgCO_3$ with lower defect concentrations due to higher equilibrium conversion to $MgCO_3$ at lower temperature. The uptake capacity shows a maximum at 340° C. and reduces again as the temperature increases beyond 340° C. The lowering of the uptake at the higher temperatures is attributed to the decrease in the equilibrium conversion to $MgCO_3$; since the enthalpy of formation of $MgCO_3$ from a mixture of $CO_2$ and MgO is negative, the equilibrium conversion ratio decreases as the temperature increases. FIG. 8 shows the estimated equilibrium conversion ratio into MgCO3 and the actual conversion ratio with 0.15.(Li—Na—K)$NO_3$—MgO and 0.15.($LiNO_3$—(Na—K)$NO_2$)—MgO by 4 h of reaction in 100% $CO_2$. The equilibrium conversion ratio estimated from the uptake capacities with 0.15.(Li—Na—K)$NO_3$—MgO and 0.15.($LiNO_3$—(Na—K)$NO_2$)—MgO following 4 h of reaction in 100% $CO_2$ is plotted in FIG. 8. $\Delta H^0$ and $\Delta S^0$ derived from the above equilibria are −180 kJ·$mol^{-1}$ and −0.28 kJ·$deg^{-1}$·$mol^{-1}$, respectively. These values are more negative than the thermodynamic data reported for the formation of $MgCO_3$ from gaseous $CO_2$ and solid MgO in the absence of the salt coatings ($CO_2$(g)+MgO(s)→$MgCO_3$(s); $\Delta H^0$=−99.02 kJ·$mol^{-1}$, $\Delta S^0$=−0.17 kJ·$deg^{-1}$·$mol^{-1}$ at 600 K).[18] In the case of the colloidal nanoclusters of MgO coated with alkali-metal salts examined in this study, the reactants (i.e., $CO_2$ and MgO) are dissolved first in the molten alkali-metal salts layer, accompanied by an increase in enthalpy for both $CO_2$ and MgO which results in an increase in the negative $\Delta H^0$ for the formation of $MgCO_3$. The dissolution of $CO_2$ induces a decrease in entropy, whereas the dissolution of MgO to generate $Mg^{2+}$ and $O^{2-}$ leads to an increase. The enhancement of negative values of $\Delta S^0$ in our results may indicate that the contribution of MgO dissolution in the molten salts works predominantly through the variation of entropy. These variations in the thermodynamic parameter values through the dissolution of the reactants appear to result in a shift of the transition point to higher temperatures than in the case of the reaction without molten salts.

The influence of the $CO_2$ concentration in the flow gas on the uptake performance is another important feature elucidated in this study. The uptake was lower with lower initial $CO_2$ concentration, and the influence of the $CO_2$ concentration was stronger at higher temperatures. The dependence on the $CO_2$ concentration may be attributed to the shift in equilibrium conversion ratio due to the change in the $CO_2$ concentration in the flow gas and, consequently that dissolved in the molten salt coatings. At 340° C., the uptake loading at low $CO_2$ concentrations (<30%) is quite low. This effect is ascribed to a significantly a lower equilibrium conversion ratio at 340° C. at a $CO_2$ concentration of 30% relative to that obtained with pure $CO_2$, since the temperature is close to the transition point (i.e., the temperature where the equilibrium conversion ratio becomes 50 mol %) of the equilibrium. At the lower temperatures, such as at 300° C. and 260° C., the variations with decreasing $CO_2$ concentration were more moderate, as these temperatures are much lower than the transition point, and the equilibrium conversion ratio is still high even at low concentrations of $CO_2$.

The marked improvements in $CO_2$ uptake on the introduction of nitrite salts to the coating layers are also an important finding in this work. This introduction of nitrite salts shortened the lag time to initiation of the accelerating increase in uptake, increased the uptake rate, and elevated the plateau value. As reported by Kust et al., alkali metal nitrites in the molten state have higher concentrations of oxide ions ($O^{2-}$) than do the nitrates at the same cation composition. The ability of the nitrite salts to accommodate higher concentrations of oxygen ions allows the fast generation of carbonate ions ($CO_3^{2-}$), which, in turn, enable fast nucleation and growth of $MgCO_3$ crystals. The enhancement in uptake loadings may be related to the variations in the critical thickness of the product layers. As confirmed by FT-IR, the nanoclusters of MgO coated with nitrate/nitrite salts generated magnesium nitro (Mg—$NO_2$) or nitrato (Mg—O—$NO_2$, Mg—$O_2$—NO, (Mg—O)$_2$=NO) on the surfaces of the MgO particles. These surface species may trigger the generation of the defects or grain boundaries in the product layer to increase the critical thickness.

High regenerability under repeated cycles of $CO_2$ uptake and release is an indispensable requirement for practical $CO_2$ adsorbents used in commercialized CCUS systems. $CO_2$ uptake by nitrates or nitrate/nitrites-coated colloidal nanoclusters of MgO is degraded slightly during the first few adsorption/desorption cycles, but the extent of this degradation during each cycle drops significantly within a few cycles and the uptake in later cycles shows an excellent regenerability in terms of both the rate and extent of uptake of $CO_2$. The degradation in the early cycles may be due to a decrease in surface area of nanoclusters due to planarization of the irregular surface or the diminishment of grain boundaries by volume expansion on the formation of $MgCO_3$ and shrinkage on release of the $CO_2$. For colloidal nanoclusters of MgO coated with nitrate/nitrites salts, the degradation following repeated adsorption/desorption cycles was much less than for clusters coated with nitrate salts alone. It is surmised that the nitro or nitrato species generated on the surface of MgO under the coatings with nitrite salts may mitigate the adverse morphological variations of colloidal clusters by the repeated cycles.

3. CONCLUSION

=high performance $CO_2$ adsorbents based on the coating of colloidal nanoclusters of MgO with alkali metal salts have been disclosed. The $CO_2$ uptake exceeded 11.7 mmol $g^{-1}$ in 30 min and reached 15.7 mmol $g^{-1}$ in 4 h in the presence of 100% dry $CO_2$ under ambient pressure at 340° C. Colloidal nanoclusters of MgO prepared by the newly developed non-hydrolytic sol-gel reaction allow a dramatic increase in the active surface area of MgO coated with thin layers of alkali metal salts, resulting in the fast generation of magnesium carbonates with high conversion ratio. The marked improvements in uptake reactivity and regenerability observed on introduction of nitrite salts to the coating layer are rationalized in terms of the formation of magnesium nitro or nitrato species under the coating; these may contribute to an increase in the critical thickness of the product layer and mitigate the adverse morphological variation in nanoclusters caused by repeated adsorption/desorption cycling.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A compound comprising a plurality of coated nanoclusters, each coated nanocluster comprising:
   a core comprising MgO; and
   a shell surrounding the core, the shell comprising alkali metal salt, wherein the alkali metal salt comprises alkali metal cations and at least one of nitrate anions and nitrite anions.

2. The compound of claim 1, wherein the alkali metal salt comprises at least one of lithium cations, sodium cations, and potassium cations.

3. The compound of claim 1, wherein the alkali metal salt comprises lithium cations, sodium cations, and potassium cations.

4. The compound of claim 3, wherein the alkali metal salt comprises nitrate anions and nitrite anions.

5. The compound of claim 1, wherein the compound has a $CO_2$ uptake capacity of at least 10 mmol·$g^{-1}$ over 30 minutes as measured in the presence of 100% dry $CO_2$ under ambient pressure at 340° C.

6. The compound of claim 1, wherein the compound has a $CO_2$ uptake capacity of at least 13 mmol·$g^{-1}$ over 4 hours as measured in the presence of 100% dry $CO_2$ under ambient pressure at 340° C.

7. The compound of claim 1, wherein the specific surface area of the coated nanoclusters as determined by BET is between about 25 and 50 $m^2$·$g^{-1}$.

8. The compound of claim 1, wherein the number of moles of alkali metal salts is from 5% to 25% of the number of moles of MgO.

9. The compound of claim 3, wherein lithium cations comprise from 20% to 40% of the number of moles of alkali metal salt, sodium cations comprise from 10% to 30% of the number of moles of alkali metal salt, and potassium cations comprise from 40% to 60% of the number of moles of alkali metal salt.

10. A method of manufacturing a plurality of coated nanoclusters, comprising:
    reacting a first solution comprising a source of magnesium, surfactant, and diol species, in a non-aqueous solvent, to synthesize a plurality of colloidal surfactant-coated nanoclusters comprising magnesium oxide (MgO);
    removing the surfactant from the plurality of colloidal surfactant-coated nanoclusters to produce a plurality of colloidal nanoclusters;
    dispersing the plurality of colloidal nanoclusters in a second solution comprising methanol and at least one salt comprising alkali metal cations and at least one of nitrate anions and nitrite anions;
    evaporating the methanol to induce precipitation of a plurality of precursor coated nanoclusters;
    re-dispersing the plurality of precursor coated nanoclusters in a suspension comprising ethanol; and
    evaporating the ethanol to provide a plurality of coated nanoclusters, each of the coated nanoclusters comprising:
    a core comprising MgO; and
    a shell surrounding the core, the shell comprising alkali metal salt, wherein the alkali metal salt comprises alkali metal cations and at least one of nitrate anions and nitrite anions.

11. The method of claim 10, wherein the at least one salt comprises $LiNO_3$, $NaNO_3$, and $KNO_3$.

12. The method of claim 11, wherein $LiNO_3$ comprises from 20% to 40% of the number of moles of $LiNO_3$, $NaNO_3$, and $KNO_3$, $NaNO_3$ comprises from 10% to 30% of the number of moles of $LiNO_3$, $NaNO_3$, and $KNO_3$, and $KNO_3$ comprises from 40% to 60% of the number of moles of $LiNO_3$, $NaNO_3$, and $KNO_3$.

13. The method of claim 10, wherein the at least one salt comprises $LiNO_3$, $NaNO_2$, and $KNO_2$.

14. The method of claim 10, wherein the number of moles of alkali metal salt in the shells of the coated nanoparticles is from 5% to 25% of the number of moles of MgO in the cores of the coated nanoparticles.

15. The method of claim 13, wherein $LiNO_3$ comprises from 20% to 40% of the number of moles of $LiNO_3$, $NaNO_2$, and $KNO_2$, $NaNO_2$ comprises from 10% to 30% of the number of moles of $LiNO_3$, $NaNO_2$, and $KNO_2$ and $KNO_2$ comprises from 40% to 60% of the number of moles of $LiNO_3$, $NaNO_2$ and $KNO_2$.

16. The method of claim 10, wherein reacting the first solution comprises performing a non-hydrolytic sol-gel reaction.

17. A method of removing $CO_2$ from a gas stream, the method comprising: introducing the gas stream comprising $CO_2$ to a plurality of coated nanoclusters, each of which comprises a core comprising MgO and a shell surrounding the core, the shell comprising alkali metal salt in a molten state, wherein the alkali metal salt comprises alkali metal cations and at least one of nitrate anions and nitrite anions; and adsorbing a portion of $CO_2$ from the gas stream onto the plurality of coated nanoclusters to produce a $CO_2$-reduced gas stream.

18. The method of claim 17, wherein the step of adsorbing comprises reacting MgO with $CO_2$ to generate magnesium carbonate ($MgCO_3$).

19. The method of claim 17, wherein the step of adsorbing occurs at a temperature of from 250° C. to 350° C.

20. The method of claim 17, wherein the step of adsorbing occurs at a pressure of from 0.8 bar to 1.2 bar.

* * * * *